United States Patent
White

(10) Patent No.: US 10,406,427 B1
(45) Date of Patent: Sep. 10, 2019

(54) ELECTRONIC TAG GAME ASSEMBLY

(71) Applicant: Joshua White, Bakersfield, CA (US)

(72) Inventor: Joshua White, Bakersfield, CA (US)

( * ) Notice: Subject to any disclaimer, the term of this patent is extended or adjusted under 35 U.S.C. 154(b) by 0 days.

(21) Appl. No.: 16/045,006

(22) Filed: Jul. 25, 2018

(51) Int. Cl.
 *A63F 9/00* (2006.01)
 *A63F 9/24* (2006.01)
 *A63B 71/02* (2006.01)

(52) U.S. Cl.
 CPC ............... *A63F 9/24* (2013.01); *A63B 71/02* (2013.01); *A63F 2009/2447* (2013.01); *A63F 2009/2451* (2013.01); *A63F 2009/2494* (2013.01); *A63F 2250/495* (2013.01)

(58) Field of Classification Search
 None
 See application file for complete search history.

(56) References Cited

U.S. PATENT DOCUMENTS

| | | | |
|---|---|---|---|
| 4,961,575 A * | 10/1990 | Perry | A63F 9/24 273/454 |
| 5,938,549 A | 8/1999 | Schenkenfelder | |
| 6,997,459 B2 * | 2/2006 | von Goeben | A63B 69/004 273/348 |
| 7,004,469 B2 | 2/2006 | von Goeben | |
| 7,192,152 B1 | 3/2007 | Hesse | |
| D677,190 S | 3/2013 | Cobbett | |
| 9,410,694 B2 | 8/2016 | Curran | |
| 2007/0026919 A1 | 2/2007 | Klitsner | |
| 2017/0007919 A1 * | 1/2017 | Cohen | A63F 13/21 |

FOREIGN PATENT DOCUMENTS

WO    WO2005011827    2/2005

* cited by examiner

*Primary Examiner* — Seng Heng Lim

(57) ABSTRACT

An electronic tag game assembly includes a plurality of bracelets that is each worn on a wrist of a respective one of a plurality of players of the game of tag. The plurality of bracelets includes a trigger bracelet worn by the player that is "it" and a set of receiver bracelets each worn by players that are not "it". A plurality of tracking units is each coupled to a respective one of the bracelets. The tracking unit on the trigger bracelet is actuatable in a first condition indicating the player wearing the trigger bracelet is "it". The tracking unit in each of the receiver bracelets is acuated into the first condition when the tracking unit in the trigger bracelet moves within a trigger distance of the tracking unit in any of the receiver bracelets. In this way the tracking units communicate a visual alert for the game of tag.

10 Claims, 4 Drawing Sheets

ELECTRONIC TAG GAME ASSEMBLY

The disclosure and prior art relates to game devices and more particularly pertains to a new game device for playing the game of tag.

BRIEF SUMMARY OF THE INVENTION

An embodiment of the disclosure meets the needs presented above by generally comprising a plurality of bracelets that is each worn on a wrist of a respective one of a plurality of players of the game of tag. The plurality of bracelets includes a trigger bracelet worn by the player that is "it" and a set of receiver bracelets each worn by players that are not "it". A plurality of tracking units is each coupled to a respective one of the bracelets. The tracking unit on the trigger bracelet is actuatable in a first condition indicating the player wearing the trigger bracelet is "it". The tracking unit in each of the receiver bracelets is acuated into the first condition when the tracking unit in the trigger bracelet moves within a trigger distance of the tracking unit in any of the receiver bracelets. In this way the tracking units communicate a visual alert for the game of tag.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
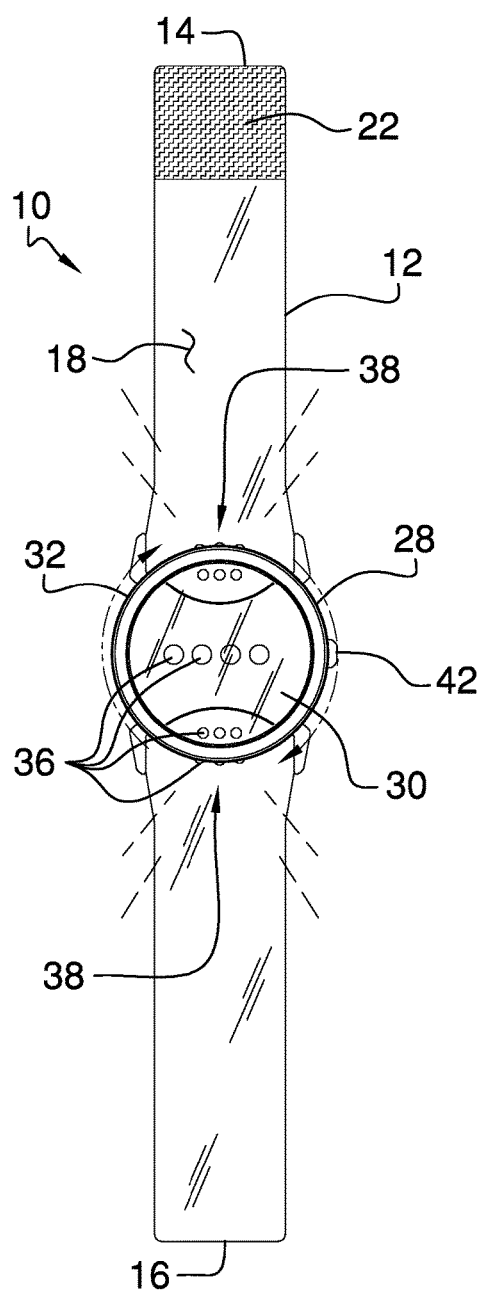
FIG. 1 is a top view of an electronic tag game assembly according to an embodiment of the disclosure.
Figure 2:
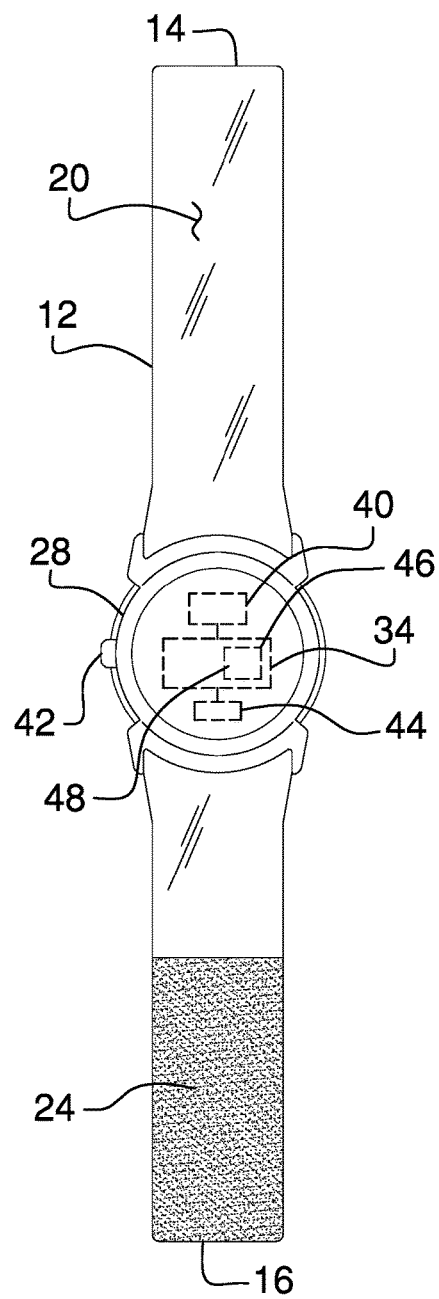
FIG. 2 is a bottom phantom view of an embodiment of the disclosure.
Figure 3:
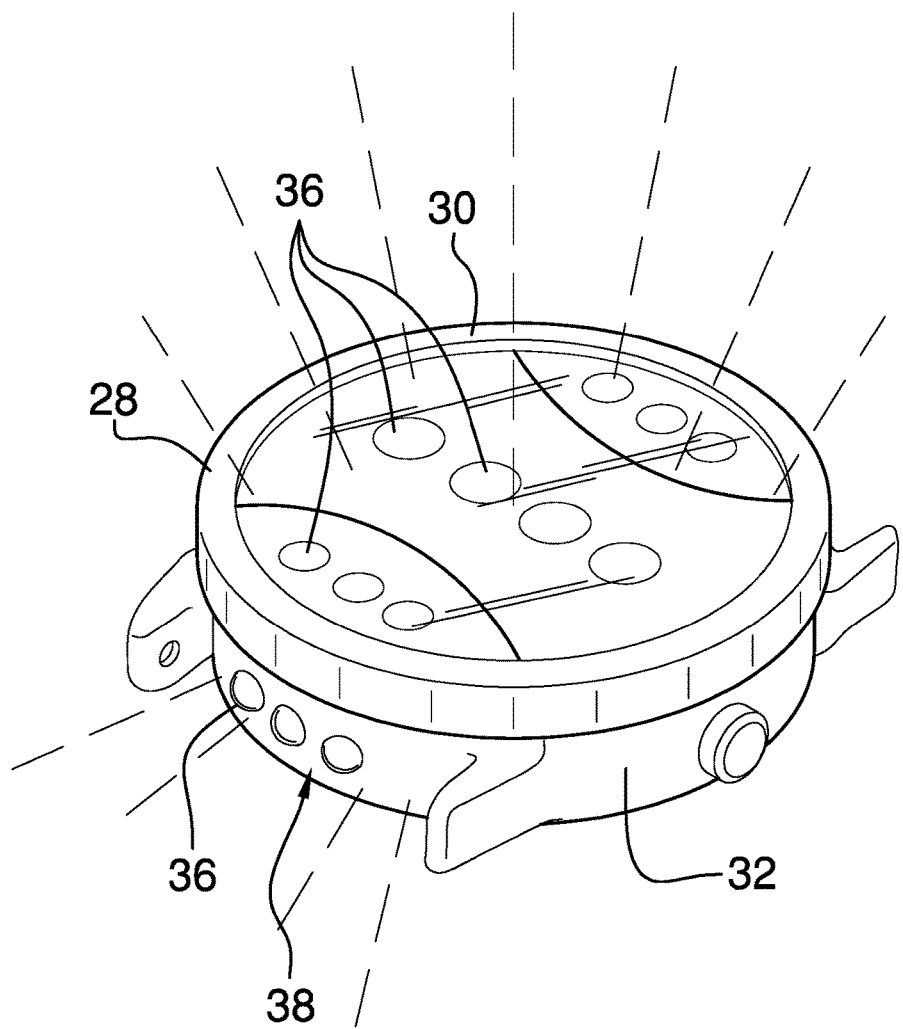
FIG. 3 is a top perspective view of a tracking unit of an embodiment of the disclosure.
Figure 4:
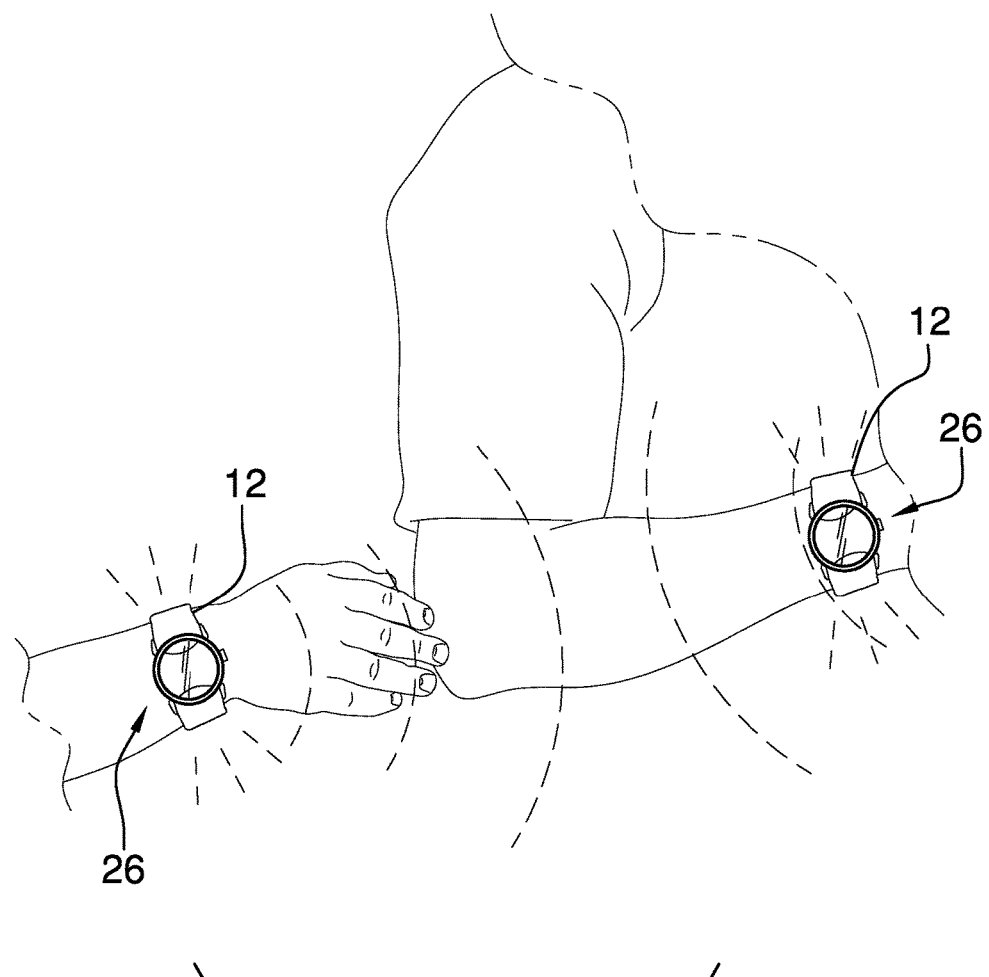
FIG. 4 is a perspective in-use view of an embodiment of the disclosure.

With reference now to the drawings, and in particular to FIGS. 1 through 5 thereof, a new game device embodying the principles and concepts of an embodiment of the disclosure and generally designated by the reference numeral 10 will be described.

As best illustrated in FIGS. 1 through 5, the electronic tag game assembly 10 generally comprises a plurality of bracelets 12 that is each worn on a wrist of a respective one of a plurality of players of the game of tag. Each of the bracelets 12 has a first end 14, a second end 16, a top surface 18 and a bottom surface 20, and each of the bracelets 12 is comprised of a translucent material. The plurality of bracelet includes a trigger bracelet that is worn by the player that is "it" and a set of receiver bracelets each worn by players that are not "it".

Each of the bracelets 12 includes a first mating member 22 that coupled to the top surface 18 of the bracelet 12 and the first mating member 22 is aligned with the first end 14. Each of the bracelets 12 includes a second mating member 24 that is coupled to the bottom surface 20 of the bracelet 12 and the second mating member 24 is aligned with the second end 16. The first mating member 22 releasably engages the second mating member 24 thereby retaining the bracelet 12 in a closed loop around the wrist. Each of the first 22 and second 24 mating members may comprise a hook and loop fastener or the like.

A plurality of tracking units 26 is provided and each of the tracking units 26 is coupled to a respective one of the bracelets 12. Each of the tracking units 26 is in wireless electrical communication with each other. Moreover, the tracking unit 26 on the trigger bracelet is actuatable in a first condition indicating the player wearing the trigger bracelet is "it". Each of the tracking units 26 in the receiver bracelets is simultaneously acuatable in a second condition indicating the players who are not "it". The tracking unit 26 in each of the receiver bracelets is acuated into the first condition when the tracking unit 26 in the trigger bracelet moves within a trigger distance of the tracking unit 26 in any of the receiver bracelets. In this way the tracking units 26 communicate a visual alert for the game of tag.

Each of the tracking units 26 comprises a housing 28 that is coupled to the respective bracelet 12. The housing 28 has a top wall 30 and an outer wall 32 extending downwardly therefrom. The bracelet 12 is coupled to the outer wall 32 having the housing 28 being centrally positioned between the first 14 and second 16 ends of the bracelet 12. A control circuit 34 is positioned within the housing 28.

A plurality of light emitters 36 is each coupled to the housing 28 for emitting light outwardly therefrom. Each of the light emitters 36 is electrically coupled to the control circuit 34. Each of the light emitters 36 is actuatable to emit a first color of light when the control circuit 34 receives a first input. Moreover, each of the light emitters 36 is actuatable to emit a second color of light when the control circuit 34 receives a second input. A first group 38 of the light emitters 36 is positioned on the outer wall 32 of the housing 28 such that the bracelet 12 is illuminated by the first group of light emitters 38. In this way the bracelet 12 communicates the visual alert for the game of tag with respect to who is "it" and who is not "it".

A transceiver 40 is positioned within the housing 28 and the transceiver 40 is electrically coupled to the control circuit 34. The transceiver 40 in each of the tracking units 26 is in electrical communication with each other. Additionally, the transceiver 40 in each of the tracking units 26 may comprise a radio frequency transceiver or the like. A button 42 is movably coupled to the outer wall 32 of the housing 28 and the button 42 is electrically coupled to the control circuit 34. The control circuit 34 receives the first input when the button 42 on the trigger bracelet is manipulated. Thus, the light emitters 36 on the trigger bracelet are actuated to emit the first color of light for indicating which player is "it". Additionally, the transceiver 40 on the trigger bracelet broadcasts a trigger signal when the button 42 on the trigger bracelet is manipulated.

A signal analyzer 44 is positioned within the housing 28 the signal analyzer 44 is electrically coupled to the control circuit 34. The signal analyzer 44 on each of the receiver bracelets 12 analyzes an intensity of the trigger signal. Additionally, the control circuit 34 in a respective one of the receiver bracelets 12 receives the first input when the signal analyzer 44 in the respective receiver bracelet detects the trigger signal above a trigger intensity. The signal analyzer 44 may be an electronic signal analyzer and the trigger intensity may be a signal intensity corresponding to a transmission distance of less that 30.0 cm.

Figure 5:
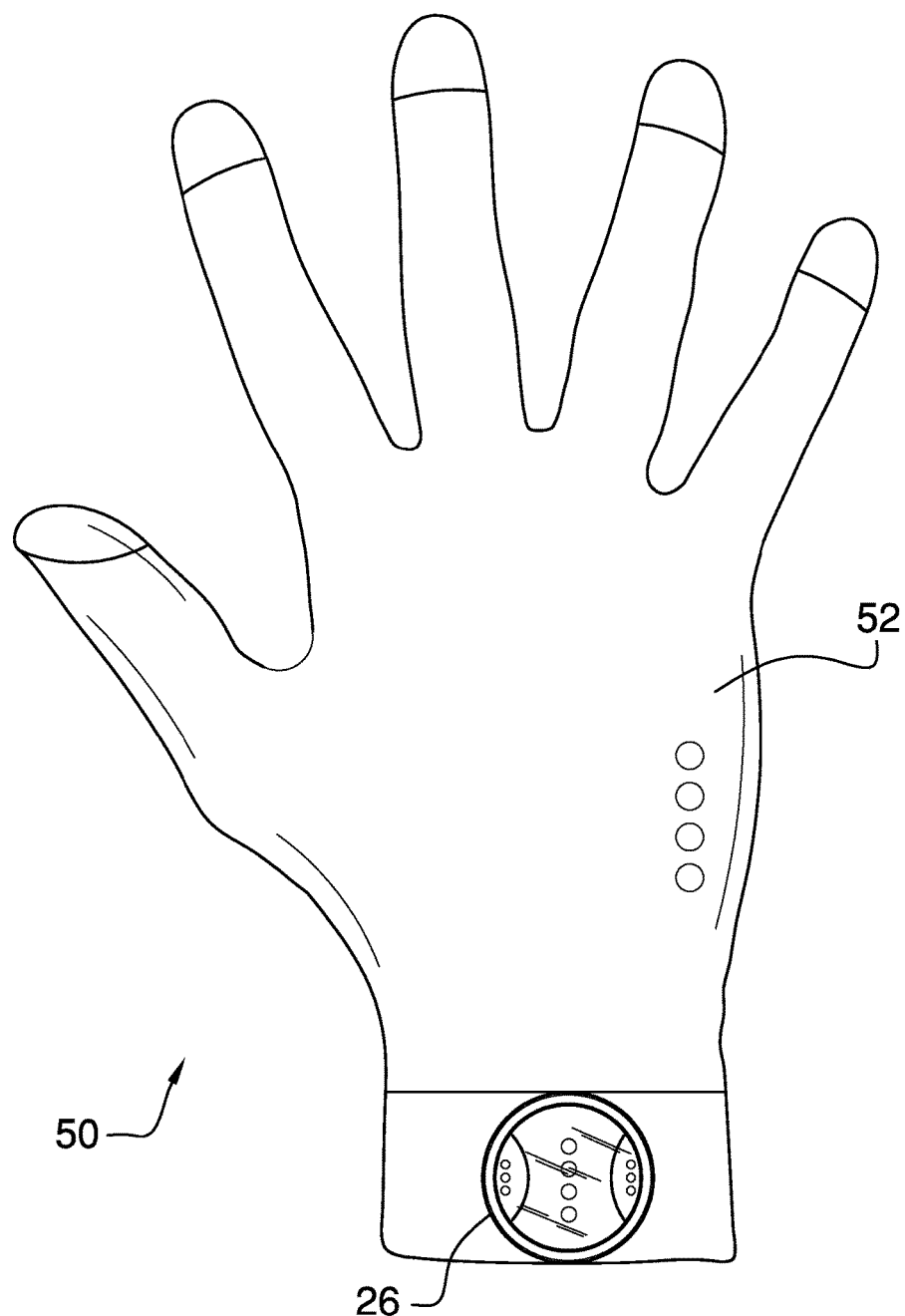
FIG. 5 is a perspective view of an alternative embodiment of the disclosure.

The control circuit 34 in the trigger bracelet receives the second input when the control circuit 34 in the respective receiver bracelet receives the first input. Thus, the trigger bracelet is consequently defined as one of the receiver bracelets and the respective receiver bracelet is consequently defined as the trigger bracelet. In this way the player who is "it" is constantly updated during the game of tag. A power supply 46 is positioned within the housing 28, the power supply 46 is electrically coupled to the control circuit 34 and the power supply 46 comprises at least one battery 48. In an alternative embodiment 50 as shown in FIG. 5, the tracking unit 26 may be positioned on a glove 52 that is worn in lieu of the bracelet 12.

In use, each player in the game of tag wears a bracelet 12 and one of the players is chosen to be "it". The button 42 on the trigger bracelet is manipulated thereby actuating the light emitters 36 on the trigger bracelet to emit the first color of light. Consequently, the light emitters 36 on each of the receiver bracelets are actuated to emit the second color of light. Thus, the game of tag begins. The player wearing the trigger bracelet attempts to move themselves close enough to any player wearing a receiver bracelet and thusly "tag" the player wearing a receiver bracelet. The light emitters 36 on the person wearing the receiver bracelet are actuated to emit the first color of light and the light emitters 36 on the person wearing the trigger bracelet are actuated to emit the second color of light when the player wearing a receiver bracelet is "tagged". In this way the game of tag is played with visual alerts for communicating which player is "it".

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electronic tag game assembly being configured to be worn by players of the game of tag thereby displaying who is "it", said assembly comprising:
   a plurality of bracelets, each of said bracelets being worn on a wrist of a respective one of a plurality of players of the game of tag, said plurality of bracelets including a trigger bracelet being worn by the player that is "it" and a set of receiver bracelets each being worn by players that are not "it"; and
   a plurality of tracking units, each of said tracking units being coupled to a respective one of said bracelets, each of said tracking units being in wireless electrical communication with each other, said tracking unit on said trigger bracelet being actuatable in a first condition indicating the player wearing said trigger bracelet is "it", each of said tracking units in said receiver bracelets being simultaneously actuatable in a second condition indicating the players who are not "it", said tracking unit in each of said receiver bracelets being actuated into said first condition when said tracking unit in said trigger bracelet moves within a trigger distance of said tracking unit in any of said receiver bracelets wherein said tracking units are configured to communicate a visual alert for the game of tag.

2. The assembly according to claim 1, wherein each of said bracelets has a first end, a second end, a top surface and a bottom surface, each of said bracelets being comprised of a translucent material, each of said bracelets including:
   a first mating member being coupled to said top surface of said bracelet, said first mating member being aligned with said first end; and
   a second mating member being coupled to said bottom surface of said bracelet, said second mating member being aligned with said second end, said first mating member releasably engaging said second mating member thereby retaining said bracelet in a closed loop around the wrist.

3. The assembly according to claim 1, wherein each of said tracking units comprises a housing being coupled to said respective bracelet, said housing having a top wall and an outer wall extending downwardly therefrom, said bracelet being coupled to said outer wall having said housing being centrally positioned between a first end and a second end of said bracelet.

4. The assembly according to claim 3, further comprising:
   a control circuit being positioned within said housing; and
   a plurality of light emitters, each of said light emitters being coupled to said housing for emitting light outwardly therefrom, each of said light emitters being electrically coupled to said control circuit;
   each of said light emitters being actuatable to emit a first color of light when said control circuit receives a first input;
   each of said light emitters being actuatable to emit a second color of light when said control circuit receives a second input; and
   a first group of said light emitters being positioned on said outer wall of said housing such that each of said bracelet is illuminated by said first group of light emitters wherein said bracelet is configured to communicate the visual alert for the game of tag.

5. The assembly according to claim 4, further comprising a transceiver being positioned within said housing, said transceiver being electrically coupled to said control circuit, said transceiver in each of said tracking units being in electrical communication with each other.

6. The assembly according to claim 5, further comprising a button being movably coupled to said outer wall of said housing, said button being electrically coupled to said control circuit, said control circuit receiving said first input when said button on said trigger bracelet is manipulated thereby actuating said light emitters on said trigger bracelet to emit said first color of light for indicating which player is "it", said transceiver on said trigger bracelet broadcasting a trigger signal when said button on said trigger bracelet is manipulated.

7. The assembly according to claim 6, further comprising a signal analyzer being positioned within said housing, said signal analyzer being electrically coupled to said control circuit, said signal analyzer on each of said receiver bracelets analyzing an intensity of said trigger signal.

8. The assembly according to claim 7, wherein:
said control circuit in a respective one of said receiver bracelets receives said first input when said signal analyzer in said respective receiver bracelet detects said trigger signal above a trigger intensity;
said control circuit in said trigger bracelet receives said second input when said control circuit in said respective receiver bracelet receives said first input thereby establishing the player wearing said respective receiver bracelet as being "it" wherein said trigger bracelet is consequently defined as one of said receiver bracelets and said respective receiver bracelet is consequently defined as said trigger bracelet.

9. The assembly according to claim 4, further comprising a power supply being positioned within said housing, said power supply being electrically coupled to said control circuit, said power supply comprising at least one battery.

10. An electronic tag game assembly being configured to be worn by players of the game of tag thereby displaying who is "it", said assembly comprising:
a plurality of bracelets, each of said bracelets being worn on a wrist of a respective one of a plurality of players of the game of tag, each of said bracelets having a first end, a second end, a top surface and a bottom surface, each of said bracelets being comprised of a translucent material, said plurality of bracelet including a trigger bracelet being worn by the player that is "it" and a set of receiver bracelets each being worn by players that are not "it", each of said bracelets including:
a first mating member being coupled to said top surface of said bracelet, said first mating member being aligned with said first end; and
a second mating member being coupled to said bottom surface of said bracelet, said second mating member being aligned with said second end, said first mating member releasably engaging said second mating member thereby retaining said bracelet in a closed loop around the wrist; and
a plurality of tracking units, each of said tracking units being coupled to a respective one of said bracelets, each of said tracking units being in wireless electrical communication with each other, said tracking unit on said trigger bracelet being actuatable in a first condition indicating the player wearing said trigger bracelet is "it", each of said tracking units in said receiver bracelets being simultaneously acuatable in a second condition indicating the players who are not "it", said tracking unit in each of said receiver bracelets being acuated into said first condition when said tracking unit in said trigger bracelet moves within a trigger distance of said tracking unit in any of said receiver bracelets wherein said tracking units are configured to communicate a visual alert for the game of tag, each of said tracking units comprising:
a housing being coupled to said respective bracelet, said housing having a top wall and an outer wall extending downwardly therefrom, said bracelet being coupled to said outer wall having said housing being centrally positioned between said first and second ends of said bracelet;
a control circuit being positioned within said housing;
a plurality of light emitters, each of said light emitters being coupled to said housing for emitting light outwardly therefrom, each of said light emitters being electrically coupled to said control circuit, each of said light emitters being actuatable to emit a first color of light when said control circuit receives a first input, each of said light emitters being actuatable to emit a second color of light when said control circuit receives a second input, a first group of said light emitters being positioned on said outer wall of said housing such that each of said bracelet is illuminated by said first group of light emitters wherein said bracelet is configured to communicate the visual alert for the game of tag;
a transceiver being positioned within said housing, said transceiver being electrically coupled to said control circuit, said transceiver in each of said tracking units being in electrical communication with each other;
a button being movably coupled to said outer wall of said housing, said button being electrically coupled to said control circuit, said control circuit receiving said first input when said button on said trigger bracelet is manipulated thereby actuating said light emitters on said trigger bracelet to emit said first color of light for indicating which player is "it", said transceiver on said trigger bracelet broadcasting a trigger signal when said button on said trigger bracelet is manipulated;
a signal analyzer being positioned within said housing, said signal analyzer being electrically coupled to said control circuit, said signal analyzer on each of said receiver bracelets analyzing an intensity of said trigger signal, said control circuit in a respective one of said receiver bracelets receiving said first input when said signal analyzer in said respective receiver bracelet detects said trigger signal above a trigger intensity, said control circuit in said trigger bracelet receiving said second input when said control circuit in said respective receiver bracelet receives said first input thereby establishing the player wearing said respective receiver bracelet as being "it" wherein said trigger bracelet is consequently defined as one of said receiver bracelets and said respective receiver bracelet is consequently defined as said trigger bracelet; and
a power supply being positioned within said housing, said power supply being electrically coupled to said control circuit, said power supply comprising at least one battery.

\* \* \* \* \*